(12) United States Patent
Li (10) Patent No.: US 12,211,254 B2
(45) Date of Patent: Jan. 28, 2025

(54) VEHICLE DISPATCH AND TRACKING BASED ON VEHICLE-CARRYING IMAGE PROCESSING

(71) Applicant: Saishi Frank Li, Austin, TX (US)

(72) Inventor: Saishi Frank Li, Austin, TX (US)

( * ) Notice: Subject to any disclaimer, the term of this patent is extended or adjusted under 35 U.S.C. 154(b) by 379 days.

(21) Appl. No.: 17/684,155

(22) Filed: Mar. 1, 2022

(65) Prior Publication Data

US 2022/0277551 A1 Sep. 1, 2022

Related U.S. Application Data

(60) Provisional application No. 63/155,083, filed on Mar. 1, 2021.

(51) Int. Cl.
*G06V 10/774* (2022.01)
*B60R 25/102* (2013.01)
(Continued)

(52) U.S. Cl.
CPC .......... *G06V 10/774* (2022.01); *B60R 25/102* (2013.01); *B60R 25/305* (2013.01); *B60R 25/31* (2013.01); *B60W 40/09* (2013.01); *G06Q 30/08* (2013.01); *G06V 10/762* (2022.01); *G06V 10/82* (2022.01); *G06V 20/582* (2022.01); *G06V 20/59* (2022.01); *G06V 40/10* (2022.01);
(Continued)

(58) Field of Classification Search
CPC .... G06V 10/774; G06V 20/59; G06V 10/762; G06V 20/582; G06V 40/10; G06V 10/82; G06V 40/20; B60R 25/102; B60R 25/305; B60R 25/31; B60W 40/09; B60W 2555/60; B60W 2420/403; B60W 2540/30; G06Q 30/08
See application file for complete search history.

(56) References Cited

U.S. PATENT DOCUMENTS

2019/0259182 A1* 8/2019 Sarukkai ................... G06T 7/97
2020/0249689 A1* 8/2020 Tatsubori ................... E01F 9/00
2023/0127977 A1* 4/2023 Haskin ................... B60R 25/305
340/5.72

FOREIGN PATENT DOCUMENTS

CN 106951981 A * 2/2017 .......... G06Q 10/083
JP 2004280225 A * 10/2004 ............... G06K 9/00

* cited by examiner

*Primary Examiner* — David F Dunphy
(74) *Attorney, Agent, or Firm* — Patterson + Sheridan, LLP (57) ABSTRACT

Methods for business operation based on vehicle-carrying image processing by using an electronic computer device are presented, the methods include: causing the electronic computing device to capture, transmit, model and interpret the images; causing the business to operate based on the assembled information conveyed through the images; causing the automatic establishment of bid processes for business transactions. In some embodiments, methods further include: mapping the Quick Response (QR) codes to the classified objects; building and applying deep learning models for pattern recognition; building and applying an embedded communication network. In some embodiments, methods further include: determining the vehicle operation status and operation irregularities. In some embodiments, methods further include: causing the searches on the embedded communication network to generate inquiries and to establish bid processes. In other embodiments, a computing device program product for business operation based on vehicle-carrying image processing by using a computing device is presented.

19 Claims, 7 Drawing Sheets

(51) Int. Cl.
*B60R 25/30* (2013.01)
*B60R 25/31* (2013.01)
*B60W 40/09* (2012.01)
*G06Q 30/08* (2012.01)
*G06V 10/762* (2022.01)
*G06V 10/82* (2022.01)
*G06V 20/58* (2022.01)
*G06V 20/59* (2022.01)
*G06V 40/10* (2022.01)
*G06V 40/20* (2022.01)

(52) U.S. Cl.
CPC ....... *G06V 40/20* (2022.01); *B60W 2420/403* (2013.01); *B60W 2540/30* (2013.01); *B60W 2555/60* (2020.02)

VEHICLE DISPATCH AND TRACKING BASED ON VEHICLE-CARRYING IMAGE PROCESSING

CROSS-REFERENCE TO RELATED APPLICATIONS

This Application claims the benefit of U.S. Provisional Application 63/155,083 filed on Mar. 1, 2021, which application is incorporated herein by reference in its entirety.

BACKGROUND

Businesses which involve vehicles, such as trucking, heavy equipment rental, construction project, etc., need to constantly track the position of the vehicles and their residing premises. Business operations may also involve recording the activities, such as shipping, receiving, in operation, in maintenance, and so on. To track vehicle activity, operations typically record the information manually (using what is known in some industries as a "run-ticket"), and the paper records are periodically collected from various business locations. The information in these paper records must be input into a computer system before it is processed. Such a "paper process" hinders the business efficiency and productivity.

There is also a need to monitor vehicle operations. It is critically important, for example, to know whether the 18-wheeler drivers have followed proper safety procedures. In another example, it is important to know how an excavator operator operates the machine on the project site. In still another example, the surveillance of a parked vehicle is often desired to warn and prevent harm to the property, such as stealing or breaking-in attempts. The conventional technologies have not provided effective and efficient methods to serve the above-mentioned business operations.

Outside of company-wide operations, the conventional business transactions, lacking effective information management, have been based on sequential communications. This means the conductors of the vehicle-related businesses have to wait for the information gathering, then send to their counterparties, then wait for responses, then iterate the responses, and so on. For example, a potential buyer of heavy equipment would send a request to dealers, and the dealers would then send back a list of available equipment, along with a report of the conditions of the equipment as well as the offered prices. The potential buyer, if still interested, subsequently sends counter offers to the dealers, and the process keeps going until a deal is reached or forfeited. Such a business transaction, based on sequential communications, is cumbersome and time consuming.

When a business process crosses two or more segments of the business chain, the sequential communications, in a similar way, handicap the business efficiency and effectiveness. For example, after a heavy equipment rental company signs a rental contract with a construction company, it needs to find a trucking company to haul the equipment from its residing yard to the project site. It takes effort for the salesman to call up trucking companies and obtain quotes for hauling, and negotiate over the phone, arrange the actual hauling of equipment, and subsequently confirm the pickup and delivery of the equipment. Sequential communications, often via phone, text and/or emails, make the business transaction cumbersome and costly.

Some technologies have emerged to enable real time location tracking of various assets, such as satellite positioning systems such as the global positioning system (GPS), Radio-frequency identification (RFID), and the like. While it is widely used, location tracking using satellite positioning systems requires the real time internet connection, which limits usage in many project sites where internet coverage is spotty or nonexistent. RFID requires chips or batteries on the tags which could be costly for some projects. Both GPS and RFID have confined functions which cannot satisfy the complexity of many business processes.

In order to practically bring high efficiency to the vehicle-related processes, methods are needed to (1) acquire the operation information (location, motion, status, etc.) automatically without internet or device confinement, (2) assemble and analyze gathered information accordingly and automatically, and (3) establish simultaneous and reciprocal communications based on the assembled information for business procedures.

As such, visual presentation of business operation based on vehicle-carrying image processing is presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for business operation based on vehicle-carrying image processing by using an electronic computer device are presented, the methods include: causing the electronic computing device to capture, transmit, model and interpret the images taken as the vehicle operates or is at a rest mode; causing the business to operate based on the assembled information conveyed through the images; causing the automatic establishment of bid processes for business transactions. In some embodiments, methods further include: mapping the Quick Response (QR) codes to the classified objects; building and applying deep learning models for pattern recognition; building and applying an embedded communication network. In some embodiments, the deep learning models based on image streams include: identifying the location of a vehicle without GPS (as GPS might not be available on site); recognizing the vehicle motion mode; recognizing the vehicle meter readings; recognizing the motion mode of objects which are surrounding a vehicle. In some embodiments, methods further include: determining the operation irregularity; determining the risk of invasion to vehicles; determining the vehicle operation status. In some embodiments, methods further include: causing the searches on the embedded communication network to generate inquiries; causing the induced inquires to generate bid processes, or in general, to generate a business process; causing the document of an agreed transaction through the bid process to be automatically generated and distributed to relevant recipients through the embedded communication network.

In other embodiments, a computing device program product for business operation based on vehicle-carrying image processing by using a computing device is presented, the computing device program product including: a non-transitory computer readable medium; first programmatic instructions for causing the electronic computing device to capture, store and transmit the images; second programmatic instructions for causing the electronic computing device to process the deep learning models; third programmatic instructions for causing the electronic computing device to interpret and communicate the model results; and fourth programmatic instructions for causing the electronic computing device to enable establishment of the bid processes and make available to users through the embedded communication network, wherein the programmatic instructions are stored on the non-transitory computer readable medium.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

DETAILED DESCRIPTION

As will be appreciated by one skilled in the art, embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, a cellphone, and any suitable combination of the foregoing.

A computer readable storage medium, as used herein, is not to be construed as being transitory signals, per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages. The computer readable program instructions may execute entirely on the user's computer including mobile device like cellphone, tablet or the like, as a stand-alone software package, or partly on the user's computer and partly on a remote computer or entirely on the remote computer or server. In the latter scenario, the remote computer may be connected to the user's computer or mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, mobile device such as cellphone or tablet, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer, a cellphone, a tablet, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
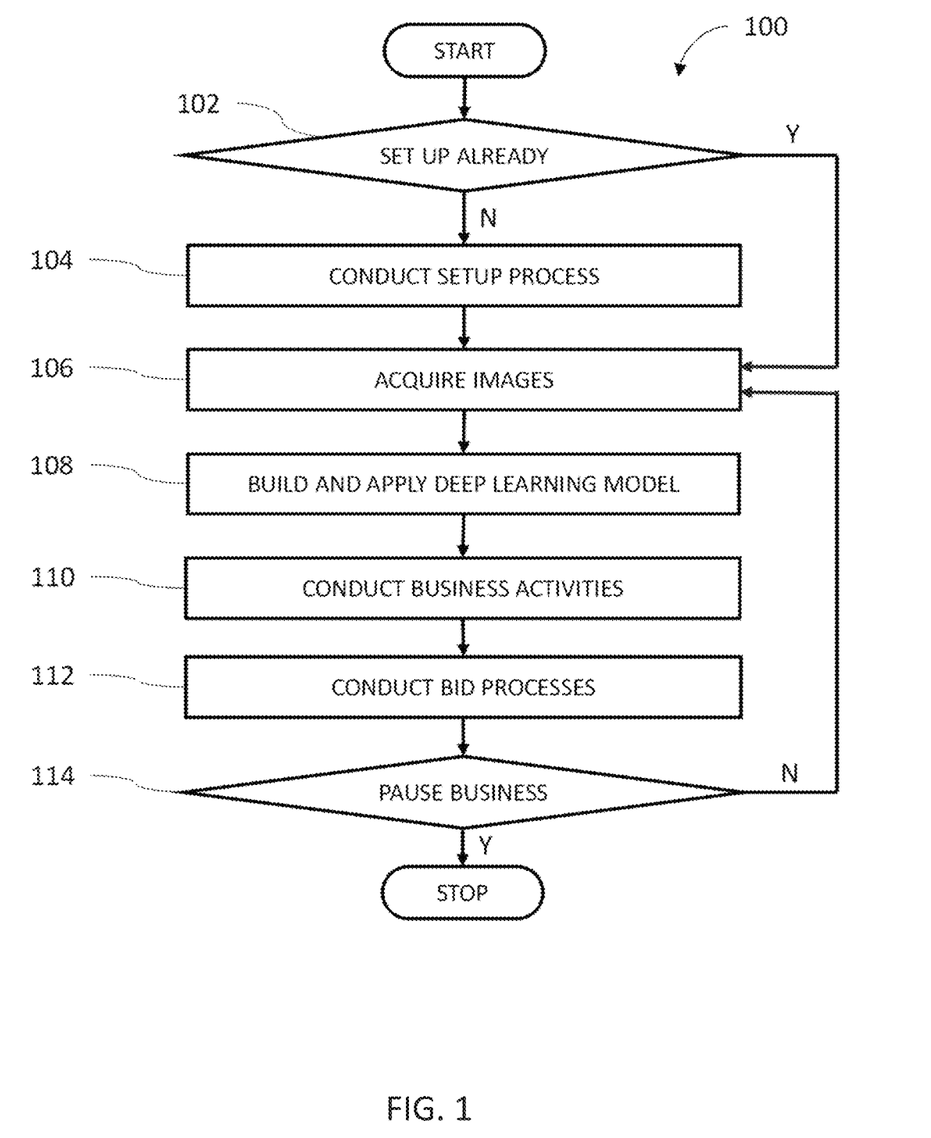
FIG. 1 is an illustrative flowchart of an overview of methods for business operation based on vehicle-carrying image processing in accordance with embodiments of the present invention.

FIG. 1 is an illustrative flowchart of an overview of methods for business operation based on vehicle-carrying image processing in accordance with embodiments of the present invention. In general, methods provided herein occur in three stages. The first stage is to pre-process in order to prepare for the application. The second stage is to acquire, model and analyze the images related to the business. The third stage is to conduct the business based on the information provided through above stages. As such, at a first step 102, the method determines whether the pre-processing is accomplished. If the method determines the pre-processing is already accomplished, the method continues to a step 106. If the method determines the pre-processing is not accomplished yet, the method continues to a step 104.

At a step 104, necessary physical devices including cameras are set up on vehicles, and QR (Quick Response) Codes are placed in all business locations. Also, at this stage, some preliminary image modeling is conducted and the object categorizations are made. For example, in an embodiment, images may consist of printed QR codes photos of the site addresses, and those are used to locate the vehicle as it is in operation; in another embodiment, images may include photos of traffic lights, photos of speed limit posts, and photos of stop signs, which are used to determine the safety compliance of the vehicle operations; in another embodiment, images may include outward photos from within a particular vehicle as the vehicle is in a rest mode, which are utilized to compare with images with approaching objects in order to alert the risk of invasion into the vehicle. After the pre-processing is accomplished, the first stage ends. Pre-processing is discussed in further detail below for FIG. 2.

At the second stage, at a step 106, outward images from front, left, right and rear sides of the vehicle, as well as inside-vehicle images are received. The images may be in a form of a series of camera shots, a series of video pictures, a series of radar signals, a series of laser signals, or the like. Image acquisition is further discussed below for FIG. 3. At a step 108, those images are used to build, update and apply certain deep learning models for (1) identifying the vehicle location with a time stamp; (2) recognizing speed limit, stop signs and traffic lights; (3) recognizing the vehicle's moving pattern; (4) recognizing abnormal surrounding object movement; (5) recognizing vehicle meter readings, and among other purposes. In some embodiments, the deep learning models may be trained using supervised learning techniques, as the main objectives are to determine certain status. For example, to recognize that a vehicle is approaching a stop sign, a series of images and the vehicle's motion status may be used to train an algorithm to recognize "running into a stop sign" from images or videos. As such, a number of benchmark images in a training data set may define the status of "running into a stop sign". The model is subsequently trained and refined by feeding various images along with the vehicle motion statuses into the algorithm with defined criteria. The variation from the characteristics of the benchmark images will be captured to feed the criteria determination. In some embodiments, though, unsupervised deep learning may apply. For example, in order to build a model for "optimal hauling route", we only set the criteria as to "maximize the profit from the hauling job", and include pick up and drop off addresses in the training data set. Then the model will try different combinations of routes, timing, fuel cost along with associated constraints, and learn to remember all traps. This is an unsupervised deep learning model which will constantly improve as more data are fed. The construction of the deep learning model based on the images is discussed in further detail below for FIG. 4.

The deep learning models trained and deployed as discussed herein may, in some aspects, include machine learning models trained to recognize temporal relationships between data in an input data set for which the machine learning models are to make a determination. For example, the deep learning models may include a long short-term memory (LSTM) model, which may be a machine learning model in which the output is conditioned on sequential information included in an input (e.g., timestamps associated with images captured at different times, etc.). In other examples, the deep learning models may include other multi-layer neural network-based models in which sequential information and the relationships between different items in a temporal sequence can be learned, such as convolutional neural networks, temporal convolutional networks, recurrent neural networks, or other deep neural networks.

At the third stage, at a next step 110, the methods then proceed to automate business activities based on the model outcome and business rules. It is this step where business efficiency and effectiveness become manifested. Conducting business activities will be discussed in detail for FIG. 5. Given all gathered and analyzed information up to now, at a step 112, the method creates a bid platform which enables instant multiple-directional communications among the business players. The bid process is further discussed in detail for FIG. 6. At a step 114, the models complete its cycle.

Figure 2:
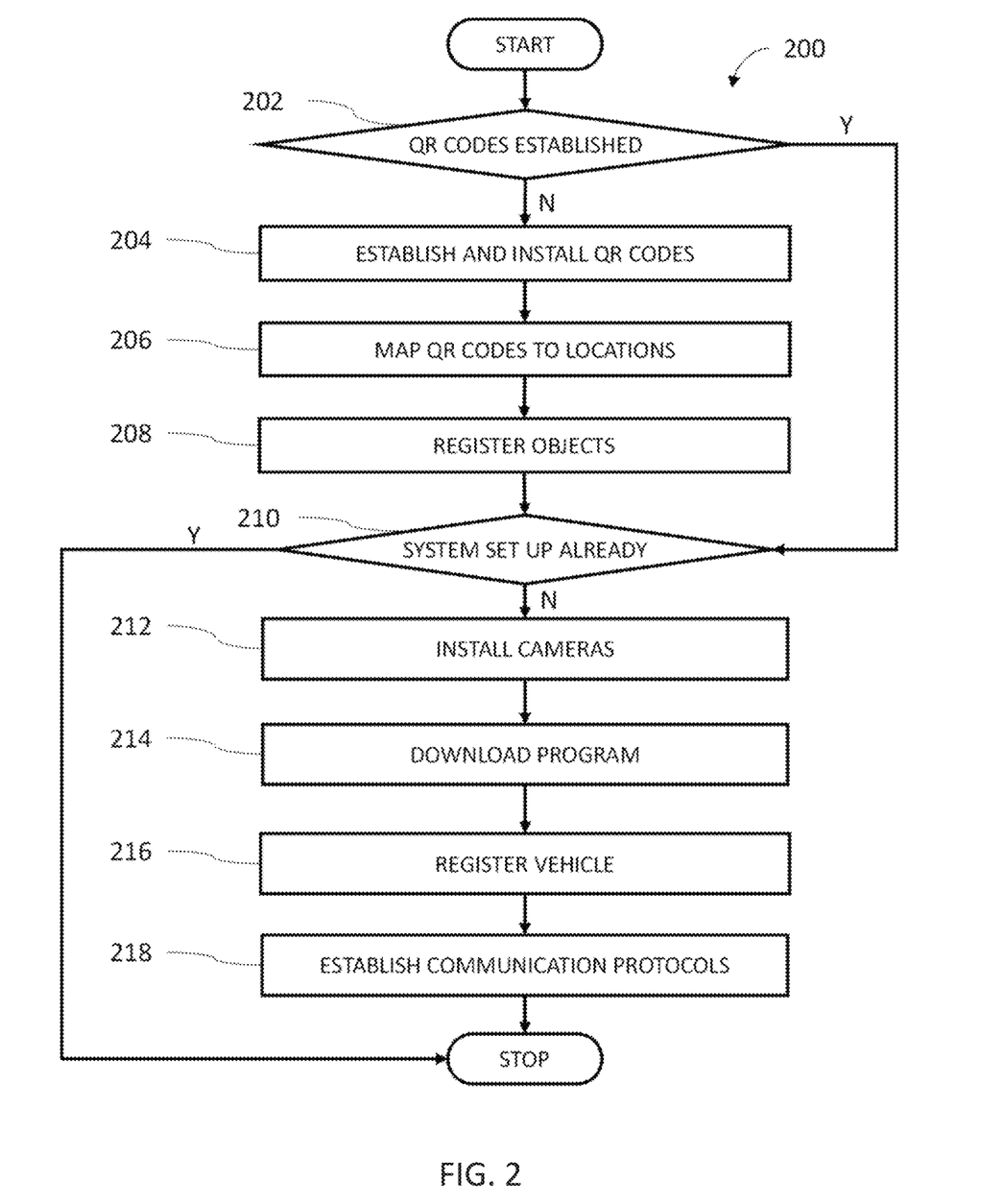
FIG. 2 is an illustrative flowchart of an overview of methods for pre-processing in accordance with embodiments of the present invention.
Figure 7:
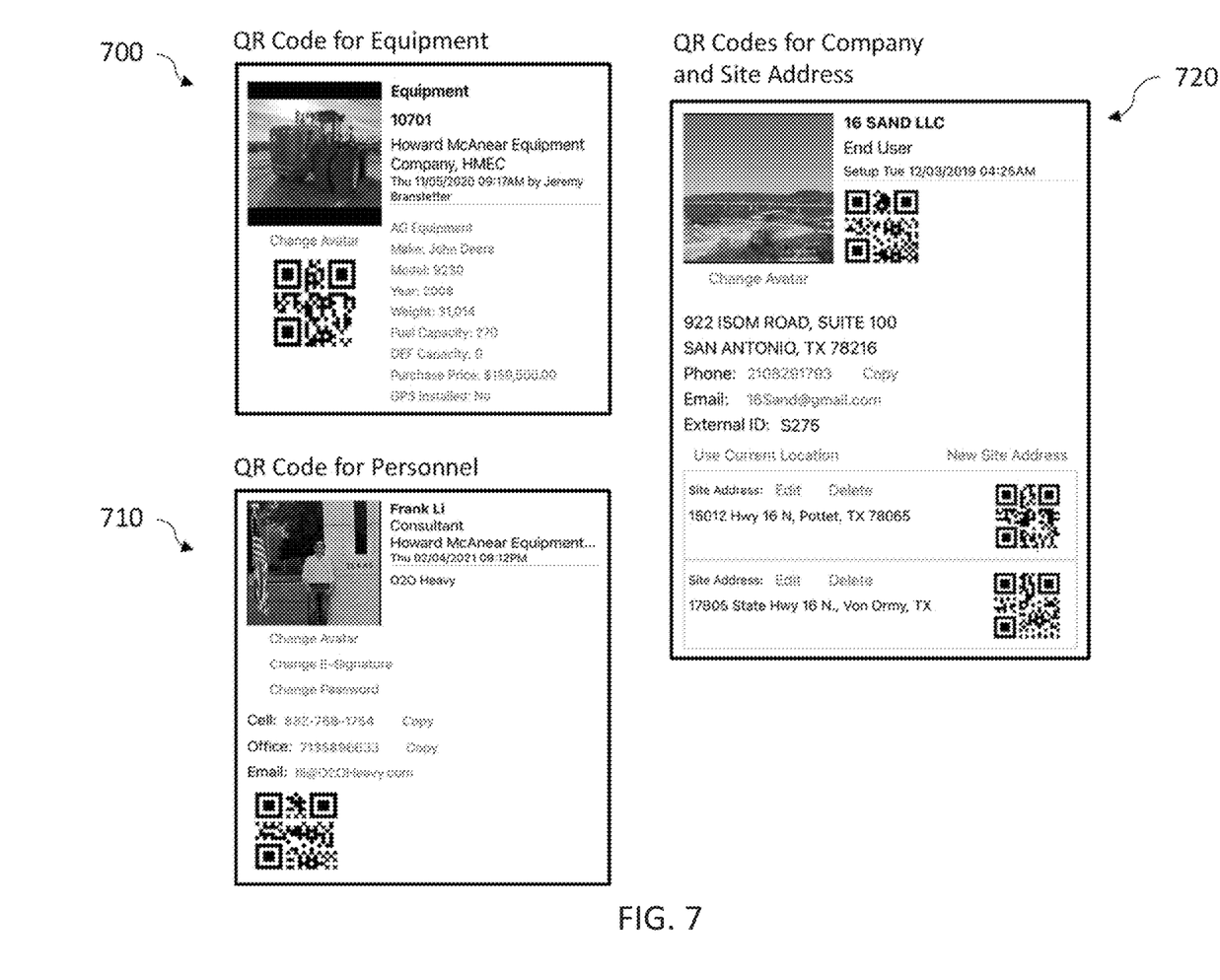
FIG. 7 contains illustrative charts of QR (Quick Response) Code examples.

FIG. 2 is an illustrative flowchart 200 of an overview of methods for the pre-processing data to generate a training data set in accordance with embodiments of the present invention. In particular, flowchart 200 provides further clarification for a step 104, FIG. 1. In general, methods provided herein need two pre-processing preparations. The first preparation is to establish a QR code system which maps QR codes to locations, business premises, vehicles, and/or personnel. It should be noted by one of ordinary skill in the art that any suitable image-based code system can be used in various embodiments described, and QR codes are used herein only as an illustrative example. At a first step 202, the method determines whether the pre-processing is accomplished. If the method determines the pre-processing is already accomplished, the method continues to a step 210. If the method determines the pre-processing is not accomplished yet, the method continues to a step 204. At a step 204, each time a site address, a vehicle, or personnel, is entered into the computer system, a corresponding QR code is generated, associated (one-on-one mapped) and stored in the system database. Examples of the QR codes are provided in FIG. 7, which shows an exemplary chart 700 for equipment QR code, an exemplary chart 710 for personnel QR code, and an exemplary chart 720 for company QR code as well as site address QR code. In an embodiment, a printed QR code is posted to a designated sign at the entry of a business site; in another embodiment, a printed QR code is attached to the body of the vehicle; in another embodiment, a QR code is associated to an account of personnel through certain mobile application (app). At a next step 206, each QR code is mapped to a location address, or to a vehicle, or to a personnel account, or to another object, according to the one-on-one relationship established when the QR codes are generated. At a step 208, object images, such as speed limit signs, stop signs, traffic light, and railroad signs, are registered in the system. This object image registration may be performed on a continuous basis. Whenever there is a need for automatic recognition of an object by the system, the image of such an object is obtained and, and the object (and associated asset—address, vehicle, personnel, etc.) is registered through the supervised registration process.

The methods then proceed to the second preparation at the next step. At a step 210, the method determine whether the system has set up certain devices and programs already. If the method determines the system is already set up, the method concludes and ends. If the method determines the system has not set up yet, the method continues to a step 212. At a step 212, a set of physical devices are installed to the vehicle. In an embodiment, the devices may include cameras. In another embodiment, the devices may include laser. In another embodiment, the devices may include radar or other devices. In another embodiment, the devices may include combination of camera, laser instrument, radar instrument and other devices. The installation will ensure those devices are powered by the vehicle or by independent power sources, and are capable to capture information from the front, left, right and rear side of the vehicle as well as the interior of the vehicle, especially the vehicle control panel where the meters are displayed. At the next step 214, method requires the downloading of the computer programs to an operating device which can be a computer, a cellphone, a table, a computer embedded within the vehicle, or the like. Such an operating device may carry a screen for the user interface or may connect to such a screen. Then the method proceeds to a step 216. At a step 216, the method first causes a registration of the vehicle to the system and the registration information includes the identification of the vehicle along with the associated QR code. Further, the method causes the establishment of the communication protocol, which may be or may not be in a form of Bluetooth, between the operating device and the imagery capturing devices. At a next step 218, the method causes to establish communication protocols between the vehicle and the servers which host the centralized database. In embodiments, the protocols may include free WIFI connections to the designated servers, the paid channels, the joint cellphone plans, or any other means. The method also causes to establish communication protocols between the personnel who are registered in the system but may belong to different business entities. In embodiments, the protocols may include an embedded social network, text network, email, phone-call, or any other means. The methods of pre-processing end at this point.

Figure 3:
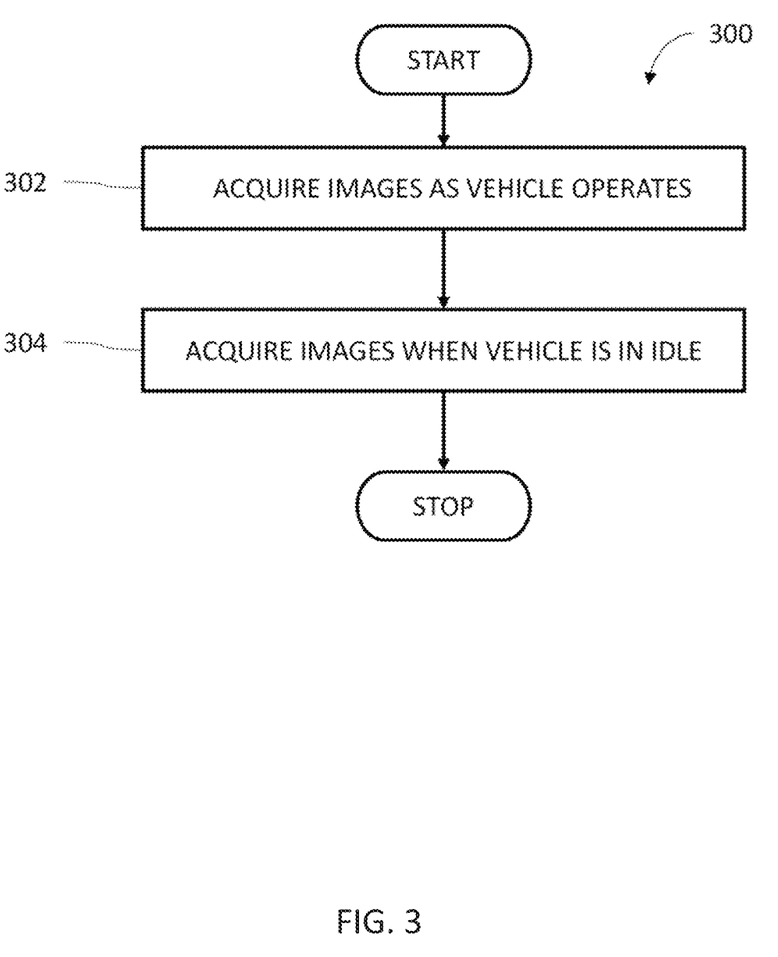
FIG. 3 is an illustrative flowchart of an overview of methods for image taking with a coordinate system in accordance with embodiments of the present invention.

FIG. 3 is an illustrative flowchart 300 of an overview of methods for image taking with a coordinate system in accordance with embodiments of the present invention. In particular, flowchart 300 provides further clarification for a step 106, FIG. 1. At a step 302, the image taking devices, such as cameras, which are installed in the vehicle during the pre-processing stage, take the outward images as the vehicle is in an operating mode or in a rest mode. Those images are used to build and improve the deep learning models, and to feed the models in order to obtain the outcomes when the models are established. In one embodiment, the images consist of QR codes printed and posted at the site locations; in another embodiment, the images consist of outward photos from within the vehicle as the vehicle is in a rest mode; in still another embodiment, the images may be in a form of consecutive photos which have a time stamp associated with each photo; in another embodiment, the images may be in a form of video segments; in another embodiment, the images may be in a form of laser signals. At the same time, camera also takes interior images, such as the images of the driver's control panel with the meter readings. In embodiments, those images are transmitted to a centralized server as they are taken through WIFI or other internet connections. In another embodiment, those images are stored in the local devices. At a step 304, the method causes the cameras to take outward images while the vehicle is in a rest mode. In embodiments, those images are transmitted to a centralized server as they are taken, through WIFI or other internet connections. In another embodiment, those images are stored in the local devices. The methods of image acquisition end at this point.

Figure 4:
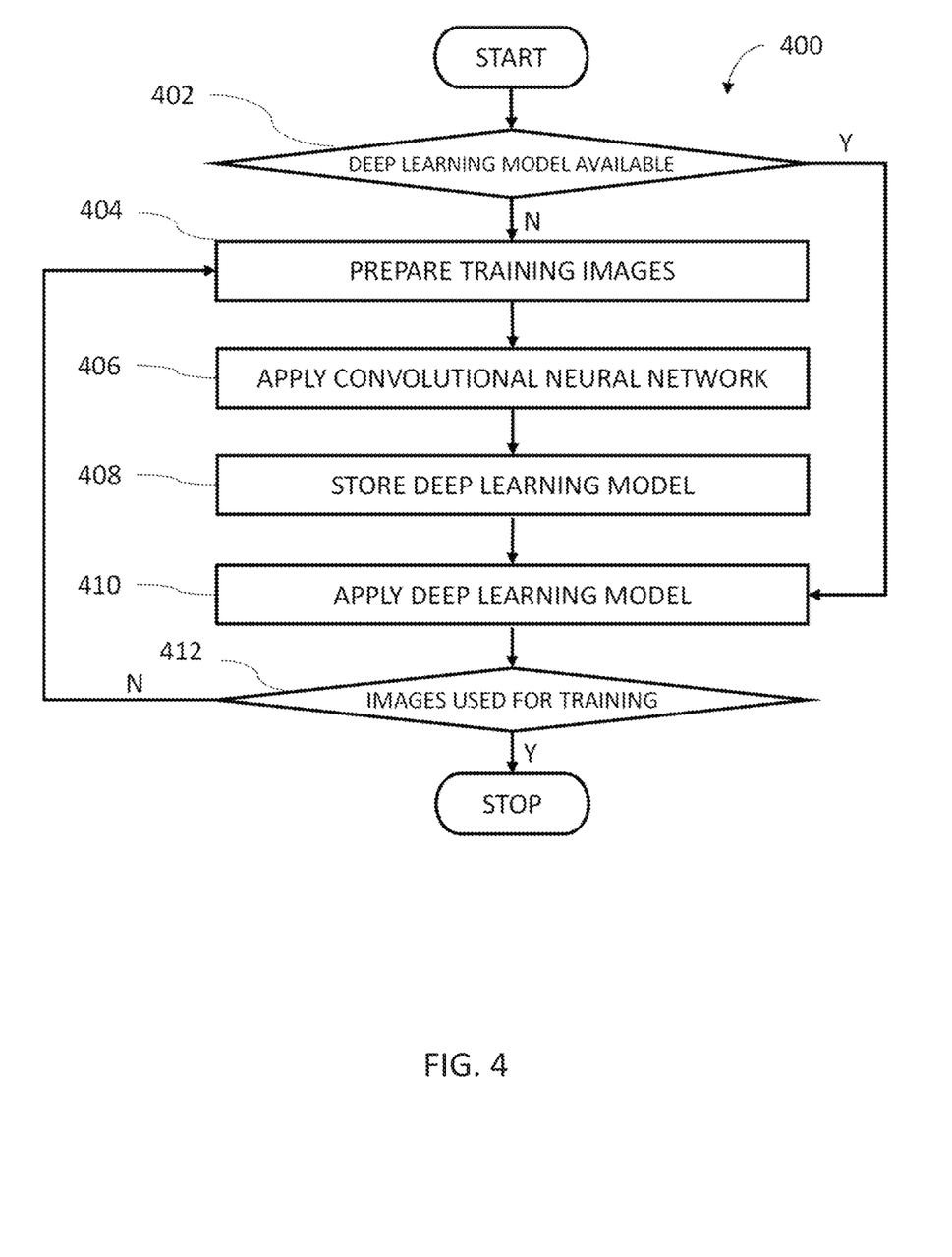
FIG. 4 is an illustrative flowchart of an overview of methods for building and applying a deep learning model in accordance with embodiments of the present invention.
Figure 5:
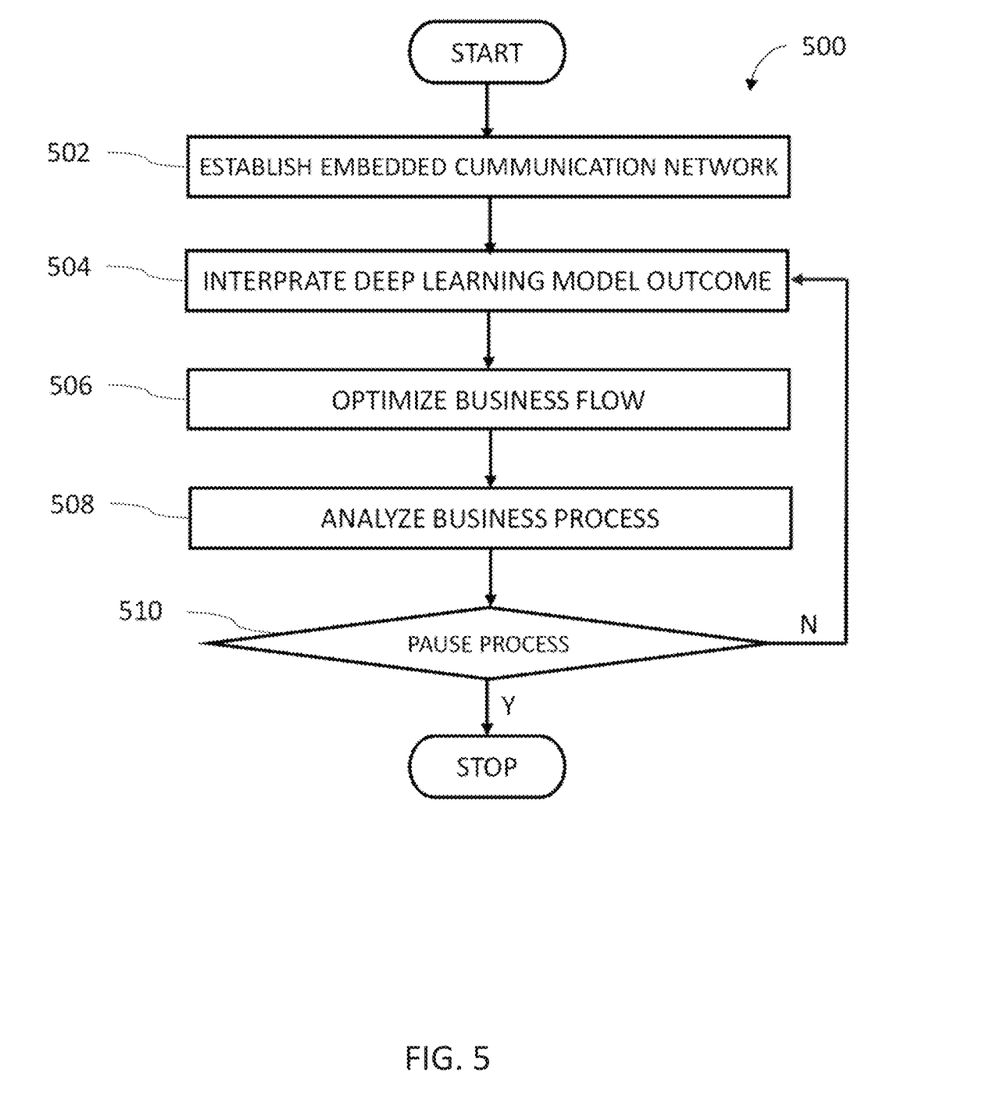
FIG. 5 is an illustrative flowchart of an overview of methods for conducting business activities in accordance with embodiments of the present invention.

FIG. 4 is an illustrative flowchart 400 of methods for building and applying a deep learning model in accordance with embodiments of the present invention. In particular, flowchart 400 provides further clarification for a step 108, FIG. 1. At a first step 402, the method determines whether the deep learning model is available to apply. If the method determines the deep learning model is already available, the method proceeds to a step 410 which will be further described below. If the method determines the deep learning model is not available yet, it proceeds to a step 404. At a step 404, the method prepares the training images from the images received from the cameras. The preparations include applying a brightness control, applying an edge detection, applying a texture filtering or combinations thereof. In embodiments, other methods may be applied for further filtering which include, but are not limited to, Hough Transformation, Fourier Transformation, and Gabor Filtering. A Hough Transformation is used to detect the straight lines in an image and to rotate lined objects. A Fourier Transformation is used to recognize objects out of the background noise by capturing the frequency patterns. Gabor Filtering is also used to extract the interested objects out from the background noise, and it is done by providing a series of frequency filters and orientation filters. Pre-processing the images with some or all of those filtering algorithms may result in more effective deep learning models. The output from the preparations may be received in any manner known in the art without departing from embodiments provided herein, and the pre-processed images are stored as distinct image sets, separated from the original images. At a next step 406, a convolutional neural network is applied to establish the deep learning models. As a type of feed-forward artificial neural network, convolutional neural network uses tiled individual neurons in such a way that they respond to overlapping regions in the visual field. In embodiments, a convolutional neural network may be updated by methods such as Region Proposal Network (RPN) and Deformable Part Models (DPM) which may improve speed and detection in some examples. At a next step 408, the method stores the deep learning models. A single model may, in some embodiments, suffice. However, multiple models may be generated in other embodiments, and the outputs of these models may be assembled in order to generate a prediction or classification of activity based on received image data and other information. For example, a model to identify an object of interest may be combined with a model to determine the speed of the object. Further, in embodiments, the deep learning models may be stored in any suitable storage manner known in the art without limitation. At a step 410, the deep learning models are applied. The method includes groups of deep learning models. In one embodiment, the model, which is trivial, is set up to recognize QR code for locations along with the addresses, the premises' owner information, and the timing of the recognition. In another embodiment, the model is to recognize the meter readings, including but not limited to the readings of vehicle odometer, vehicle operation hours, vehicle moving speed, fuel level and oil level. The recognized meter readings are converted to and stored as numeric digits, along with the timing of the readings. In another embodiment, the model is to recognize the speed limit, the stop signs, the traffic lights, and captures the timing of the recognition. In another embodiment, the model is to determine abnormal object movement where the abnormality is defined according to the business specifications. For example, while the vehicle is in a rest mode without a driver in the vehicle, the abnormality is defined as "outside objects moving toward the vehicle within certain distance". The model will detect such an abnormality and a signal will be sent through the communication protocol accordingly. The outcomes of the deep learning models are then transmitted to and interpreted by the business module for which a step 504 will provide a detailed clarification. Going further, the method ensures a continuous learning from the passed-in images, therefore, at a next step 412, the method determines whether segmented images of the objects have been utilized to train the deep learning model. If the method determines the segmented images of the objects have not been utilized for the training, it returns to a step 404. If the method determines the segmented images of the objects have already been utilized for the training, the method ends.

FIG. 5 is an illustrative flowchart 500 of an overview of methods for conducting business activities in accordance with embodiments of the present invention. In particular, flowchart 500 provides further clarification for a step 110, FIG. 1. At a step 502, the method establishes an embedded communication network on which all information is stored, archived, transmitted and exchanged. Such information includes but is not limited to data, analytic result, photo, voice record, warning flag, the prompting signal, instruction, feedback, discussion, price quote, contract document, vehicle status, report, business profile, business contact, etc. For example, in one embodiment, when a vehicle arrives at a premise, as the QR code is read and transmitted to the server, the method causes a message to be sent to relevant groups through the embedded communication network about the vehicle ID, its current location, the time it reaches the premise, its fuel level, and/or which contract the vehicle is under. In another embodiment, when a vehicle operation illustrates irregularity, the method causes a message to be sent to certain chat group in the embedded communication network and to archive the irregular operation. At a step 504, the model results are interpreted by the computer algorithms. In embodiments, for any registered vehicle in the system, its physical moving trajectory is presented along with time stamps based on the QR code reading. The trajectory is then combined with the business contracts, therefore the contract fulfillment is monitored by the system, and any deviation from the contract will be automatically detected. In another embodiment, the numeric reading of the vehicle meters is interpreted as the record of the fuel level, the mileage, and hours of vehicle operations. In another embodiment, a series of images of red traffic light is interpreted as a violation of traffic law by the driver. In another embodiment, while the vehicle is in a rest mode, a detected abnormality is interpreted as "the vehicle is at the risk of invasion and theft". Given the real time business interpretation, at a next step 506, the method causes business optimization activities to be conducted. In one embodiment, based on the business contract fulfillment, invoices are automatically generated and sent to the relevant recipients through, but not limited to, the embedded communication network. In another embodiment, as the method causes a rental company which owns heavy equipment to see the location distribution, the conditions and associated contracts of the entire fleet at any given time, the business conductor may construct an operation strategy to maximize the utilization of the heavy equipment according to the business contracts. The method causes such a strategy to include one or more of contracting, dispatching, monitoring, and adjusting of the equipment through, but not limited to, the embedded communication network. At a next step 508, the method causes the analysis of the business processes based on the accumulated data. In one embodiment, the method causes the image stream of the physical movement of a wheeled heavy equipment during its operation to be analyzed by a deep learning model to determine the irregularities. For example, a sudden turning of the heavy equipment illustrated through the image series may be determined as a violation of the operation rules. When it occurs, the method causes the associated group of images, along with the timing and a warning flag to be sent to relevant recipients through, but not limited to, the embedded communication network. In embodiments, such analyses can be designated to select random and sporadic image samples as statistically significant examinations or be designated as continuous and exhaustive examinations with all image streams as they are acquired. The latter designation is applicable when a vehicle is in a rest model. When the ongoing images stream is analyzed and determined as "outside objects moving toward the vehicle within certain distance", the method causes a warning flag to be sent to relevant recipients through, but not limited to, the embedded communication network, along with the image stream in a form of a series of photos or in a form of live video. At a next step 510, the method determines whether there is new result out from the deep learning models. If the method obtains new results from the deep learning models, it returns to a step 504. If the method determines that no new result is coming, the method ends.

Figure 6:
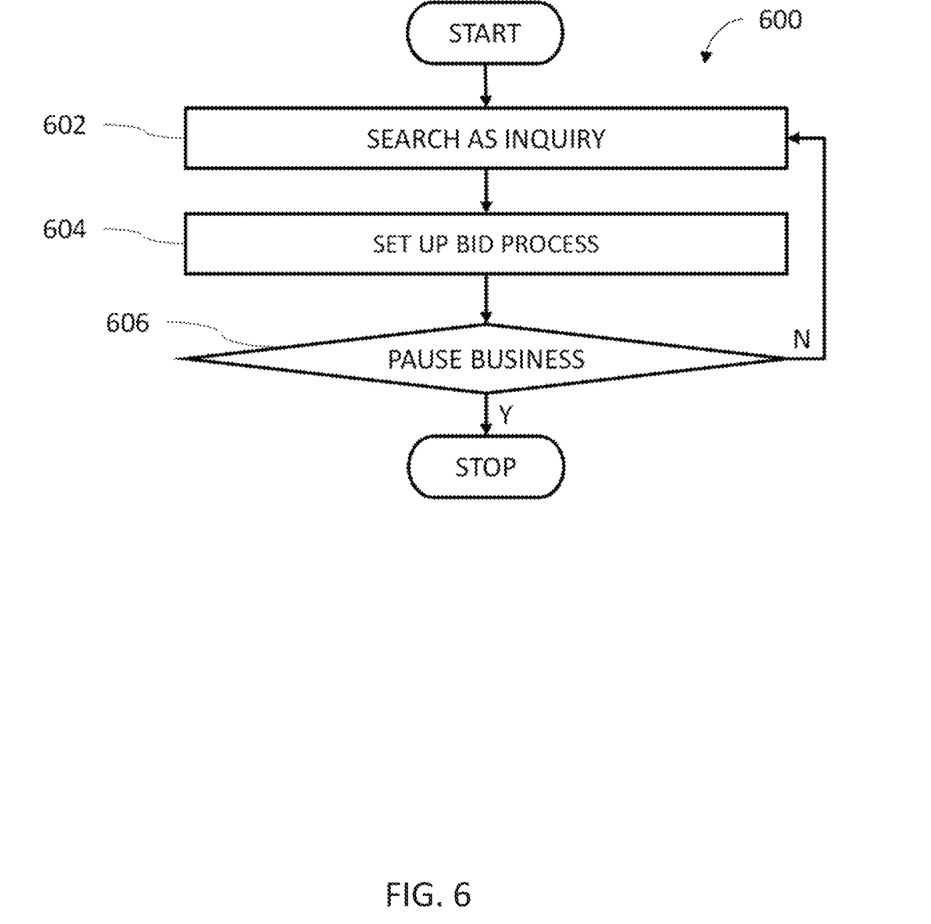
FIG. 6 is an illustrative flowchart of an overview of methods for conducting bid processes in accordance with embodiments of the present invention.

FIG. 6 is an illustrative flowchart 600 of an overview of methods for conducting bid processes in accordance with embodiments of the present invention. In particular, flowchart 600 provides further clarification for a step 112, FIG. 1. At a step 602, the method allows the registered users to search for the information about any objects available in the embedded communication network. In one embodiment, the search may target a desired vehicle such as heavy equipment. In another embodiment, the search may aim toward the vehicle maintenance service providers. The method causes the embedded communication network to maintain the entire history of the object evolvement. In this respect, the information search here sets a base for business decisions. Further, the method causes the searches to be inquiries at the user's will, that is, when set so by the user, that the search for an object causes the system to generate an inquiry for the object. For example, a search for a particular model of heavy equipment causes the system to generate a purchase or rental inquiry about such an equipment. Another example is that a search for a heavy equipment hauling service causes the system to generate a service inquiry. The searching results and the induced inquiries are presented in the embedded communication network to relevant participants. At a next step 604, the method causes a bid process to be initiated for each of the induced inquires. That is, the inquiry contains the information about the object, and with such information, a mechanism is automatically set up for the provider (owner or operator or manager) of the object to propose a price, and for the searcher of the object to offer a price, aiming for a mutually desired transaction (sale, or rent, or services, or the like). By "price" herein it refers to any exchange means, monetary or otherwise. In one embodiment, the bid process may be presented exclusively to the provider and the searcher; that is, it is a one-to-one process. In another embodiment, the bid process may be presented to a group of providers and the searcher; that is, it is a many-to-one process. In another embodiment, the bid process may be presented to a group of providers and a group of the searchers; that is, it is a many-to-many process. The method causes the bid process to continue with unlimited rounds of bid/offer presentations until mutually agreed terms are reached between a provider and a searcher, or until the process is terminated. In another embodiment, the method causes the document of an agreed transaction to be automatically generated and distributed to relevant recipients through the embedded communication network. At a next step 606, the method determines whether new searches exist. If the method determines new searches exist in the embedded communication network, it returns to a step 602. If the method determines that there is no new search, the method ends.

In some embodiments, a system includes a memory having computer-executable instructions stored thereon and a processor configured to execute the computer-executable instructions to cause the system to receive, from one or more cameras installed in a vehicle, a sequence of images for analysis; to identify, using one or more trained machine learning models and the received sequence of images, a pattern of activity associated with the received sequence of images, wherein the one or more trained machine learning models comprise models having been trained based on data sets of a plurality of sequences of images, each sequence of images in the plurality of sequences being associated with one of a plurality of activity patterns; and to take one or more actions based on the determination.

In some embodiments, a system includes means for receiving a training data set including a plurality of image sequences, wherein each respective image sequence of the plurality of image sequences comprises a plurality of images corresponding to a sequence of events associated with a pattern of activity; means for training one or more machine learning models based on the training data set; and means for deploying the trained one or more machine learning models to an activity detection system.

In some embodiments, a system includes means for receiving, from one or more cameras installed in a vehicle, a sequence of images for analysis; means for identifying, using one or more trained machine learning models and the received sequence of images, a pattern of activity associated with the received sequence of images, wherein the one or more trained machine learning models comprise models having been trained based on data sets of a plurality of sequences of images, each sequence of images in the plurality of sequences being associated with one of a plurality of activity patterns; and means for taking one or more actions based on the determination.

In some embodiments, a non-transitory computer-readable medium having instructions stored thereon which, when executed by a processor, performs an operation for training an activity pattern recognition model to recognize patterns of activity with respect to a vehicle. In some embodiments, the operation includes receiving a training data set including a plurality of image sequences, wherein each respective image sequence of the plurality of image sequences comprises a plurality of images corresponding to a sequence of events associated with a pattern of activity; training one or more machine learning models based on the training data set; and deploying the trained one or more machine learning models to an activity detection system.

In some embodiments, a non-transitory computer-readable medium having instructions stored thereon which, when executed by a processor, performs an operation for detecting activity patterns with respect to a vehicle based on captured sequences of images. In some embodiments, the operation includes receiving, from one or more cameras installed in the vehicle, a sequence of images for analysis; identifying, using one or more trained machine learning models and the received sequence of images, a pattern of activity associated with the received sequence of images, wherein the one or more trained machine learning models comprise models having been trained based on data sets of a plurality of sequences of images, each sequence of images in the plurality of sequences being associated with one of a plurality of activity patterns; and taking one or more actions based on the determination.

In some embodiments, a method for detecting activity patterns with respect to a vehicle based on captured sequences of images includes receiving, from one or more cameras installed in the vehicle, a sequence of images for analysis; identifying, using one or more trained machine learning models and the received sequence of images, a pattern of activity associated with the received sequence of images, wherein the one or more trained machine learning models comprise models having been trained based on data sets of a plurality of sequences of images, each sequence of images in the plurality of sequences being associated with one of a plurality of activity patterns; and taking one or more actions based on the determination.

In some embodiments, the received sequence of images comprises a plurality of images combining timestamped images of one or more gauges in the vehicle and road signs detected in the vehicle operating environment, and wherein the trained one or more machine learning models are trained to determine whether an operator of the vehicle is in compliance with driving rules embodied in the road signs based on the timestamped images and timing gaps between different images.

In some embodiments, the one or more actions include generating an alert including an indication that the operator of the vehicle is not in compliance with the driving rules, and transmitting the alert to a computer system associated with a manager of the vehicle for further review.

In some embodiments, a system includes a memory having computer-executable instructions stored thereon; and a processor configured to execute the computer-executable instructions to cause the system to receive a training data set including a plurality of image sequences, wherein each respective image sequence of the plurality of image sequences comprises a plurality of images corresponding to a sequence of events associated with a pattern of activity; to train one or more machine learning models based on the training data set; and to deploy the trained one or more machine learning models to an activity detection system.

In some embodiments, a method for training an activity pattern recognition model to recognize patterns of activity with respect to a vehicle includes receiving a training data set including a plurality of image sequences, wherein each respective image sequence of the plurality of image sequences comprises a plurality of images corresponding to a sequence of events associated with a pattern of activity; training one or more machine learning models based on the training data set; and deploying the trained one or more machine learning models to an activity detection system.

In some embodiments, the plurality of image sequences comprise a plurality of images combining timestamped images of one or more gauges in a vehicle and road signs detected in the vehicle operating environment, and wherein the trained one or more machine learning models are trained to recognize compliance with driving rules embodied in the road signs based on the timestamped images and timing gaps between different images.

What is claimed is:

1. A method for detecting activity patterns with respect to a vehicle based on captured sequences of images, comprising:
    receiving, from one or more cameras installed in the vehicle, a sequence of images for analysis;
    identifying, using one or more trained machine learning models and the received sequence of images, a pattern of activity associated with the received sequence of images, wherein:
        the one or more trained machine learning models comprise models having been trained based on data sets of a plurality of sequences of images, each sequence of images in the plurality of sequences being associated with one of a plurality of activity patterns,
        the received sequence of images comprises a plurality of images combining timestamped images of one or more gauges in the vehicle and road signs detected in the vehicle operating environment, and
        the trained one or more machine learning models are trained to determine whether an operator of the vehicle is in compliance with driving rules embodied in the road signs based on the timestamped images and time gaps between different images in the received sequence of images; and
    taking one or more actions based on the identifying.

2. The method of claim 1, wherein the one or more trained machine learning models comprise one or more machine learning models trained using supervised learning techniques.

3. The method of claim 1, wherein the one or more trained machine learning models comprise one or more machine learning models trained using unsupervised learning techniques.

4. The method of claim 1, wherein one of the one or more trained machine learning models comprises a long short-term memory (LSTM) model.

5. The method of claim 1, wherein the received sequence of images comprises a plurality of timestamped images of image-based codes associated with different assets in a vehicle operating environment.

6. The method of claim 5, wherein the trained one or more machine learning models is configured to determine, based on the received sequence of images, a route on which the vehicle is traveling and an estimated time at which the vehicle is expected to complete traveling the route.

7. The method of claim 6, wherein the one or more actions comprise:
    indicating, to one or more users of a software application, the estimated time at which the vehicle is expected to complete traveling the route; and
    based on indicating the estimated time, triggering a bidding process for a job to transport the vehicle at the estimated time.

8. The method of claim 5, wherein the one or more actions comprise:
    indicating, to one or more users of a software application, an estimated time at which the vehicle is expected to be in one of a one or more operating states; and
    based on indicating the estimated time, triggering a bidding process for a job related to services associated with the vehicle at the estimated time.

9. The method of claim 1, wherein the received sequence of images comprises a plurality of timestamped images from one or more external facing cameras in the vehicle, wherein the trained one or more machine learning models are trained to determine that the received sequence of images indicates that a person is approaching the vehicle.

10. The method of claim 9, wherein the one or more actions comprise: generating an alert including an indication that the person is approaching the vehicle, and transmitting the alert to a computer system associated with a manager of the vehicle for further review.

11. The method of claim 1, wherein the one or more actions comprise: generating an alert including an indication that the operator of the vehicle is not in compliance with the driving rules, and transmitting the alert to a computer system associated with a manager of the vehicle for further review.

12. A method for training an activity pattern recognition model to recognize patterns of activity with respect to a vehicle, comprising:
    receiving a training data set including a plurality of image sequences, wherein:
        each respective image sequence of the plurality of image sequences comprises a plurality of images corresponding to a sequence of events associated with a pattern of activity, and each respective image sequence comprises a plurality of images combining timestamped images of one or more gauges in the vehicle and road signs detected in the vehicle operating environment;

training one or more machine learning models based on the training data set, wherein training the one or more machine learning models comprises training the one or more machine learning models to determine whether an operator of the vehicle is in compliance with driving rules embodied in the road signs based on the timestamped images and time gaps between different images in a sequence of images; and deploying the trained one or more machine learning models to an activity detection system.

13. The method of claim 12, wherein training the one or more machine learning models based on the training data set comprises training the one or more machine learning models using supervised learning techniques, and wherein each respective image sequence of the plurality of image sequences is tagged with an indication of a type of activity to which the respective image sequence corresponds.

14. The method of claim 12, wherein training the one or more machine learning models based on the training data set comprises training the one or more machine learning models using unsupervised learning techniques.

15. The method of claim 12, wherein one of the one or more machine learning models comprises a long short term memory (LSTM) model.

16. The method of claim 12, wherein the plurality of image sequences comprise a plurality of timestamped images of image-based codes associated with different assets in a vehicle operating environment.

17. The method of claim 16, wherein the trained one or more machine learning models are trained to recognize a route on which a vehicle is traveling in the vehicle operating environment.

18. The method of claim 17, wherein the trained one or more machine learning models are further trained to predict a time at which the vehicle will complete traveling the route and become available for subsequent use.

19. The method of claim 18, wherein the plurality of image sequences comprise a plurality of timestamped images from one or more external facing cameras in a vehicle, and wherein the trained one or more machine learning models are trained to recognize a sequence of images as corresponding to a person approaching the vehicle.

\* \* \* \* \*